Patented Apr. 25, 1950

2,505,344

UNITED STATES PATENT OFFICE 2,505,344

PRODUCTION OF TITANIUM DIOXIDE

Charles A. Tanner, Jr., Collingswood, N. J., assignor to American Cyanamid Company, New York, N. Y., a corporation of Maine No Drawing. Application July 24, 1946,
Serial No. 685,919

3 Claims. (Cl. 23—202)

This invention relates to the preparation of rutile titanium dioxide by the calcination of an anatase precipitate under controlled conditions, and relates particularly to a method of preparing a rutile calcination seed material.

Titanium dioxide, within recent years, has become the outstanding white pigment used in the coating and allied industries. The popularity of titanium pigment is due mainly to its whiteness, stability, high hiding power, higher tinting strength, and ready dispersibility in a variety of vehicles. It is commonly prepared by the hydrolysis, under carefully controlled conditions, of titanium sulfate solutions containing iron, by the digestion of ilmenite with sulfuric acid, followed by reduction of all ferric iron to ferrous iron, removal of most of the iron by crystallization as ferrous sulfate, clarification and adjustment of concentration. The hydrolysate is calcined, together with conditioning agents, to produce the desired white pigment.

The titanium dioxide so produced has been predominantly of anatase crystal structure, one of the three crystal modifications (anatase, brookite, rutile) in which titanium dioxide occurs. It is known in the art that the rutile crystal modification has a higher hiding power and tinting strength than the anatase structure, but rutile titanium dioxide having these desirable characteristics has become available economically only recently at a cost comparable with that of producing anatase by the development of seeding processes of the type dealt with by the present invention.

The uncalcined precipitate obtained by the hydrolysis of titanium sulfate is of the anatase crystal modification, which may be further developed upon calcination thereof as the combined water and the combined and/or absorbed acid are expelled. It is known in the art that the uncalcined precipitate obtained by the hydrolysis of titanium salts of monobasic acids has the rutile crystal structure which is further developed upon calcination. It is also well known that the anatase structure obtained by the hydrolysis of titanium sulfate can be converted to rutile by continued calcination at extremely high temperatures. Such calcination, however, causes undesired crystal growth and discoloration which results in a product which is undesirable for use as a white pigment. There is no economically competitive process of precipitating titanium dioxide from monobasic acid salts thereof, largely because of higher acid costs and corrosion problems inherent in the use of these monobasic acids.

Several methods have been developed for accomplishing the conversion of titanium oxide having an anatase crystal structure to rutile titanium oxide by calcining the oxide in the presence of a rutile seed material. The rutile seed has usually been a titanium oxide exhibiting rutile characteristics and which has served to induce, during calcination treatment, the conversion of anatase titanium oxide to the rutile crystal modification thereof. The rutile seed materials have largely been prepared by the hydrolysis of tetravalent titanium compounds such as titanium tetrachloride and the like compounds which were ordinarily produced by preparing a metal titanate from a purified hydrated titanium oxide and reacting the metal titanate with a monobasic acid. It has been found that such tetravalent titanium compounds may be most expediently prepared by employing metal titanates having relatively high solubility in the various monobasic acids. The prior art has amply demonstrated that, of the various metal titanates, sodium titanate in its various modifications has the most satisfactory characteristics, both as to its solubility in monobasic acids and as to the effectiveness of the rutile seed produced therefrom.

The present invention is based on the discovery that an improved rutile seed material may be prepared from titanium phosphate. A decided advantage of the invention resides in the fact that the titanium phosphate may be prepared directly from the liquors obtained from the sulfuric acid digestion of titanium-bearing ores without the necessity of first subjecting the liquor to the usual hydrolysis and purification treatments. Another advantage provided by the novel rutile seed of this invention is that this rutile seed is equally as active as rutile seed materials heretofore produced according to the prior art procedures, and in many instances the seed of this invention is more active than previously produced seed materials. The improved rutile-inducing characteristics of this novel seed were entirely unexpected, there being no logical manner of predicting that seed prepared from titanium phosphate would exhibit increased effectiveness in converting anatase titanium oxide to rutile titanium oxide. An additional advantage provided by the invention is a method of preparing titanium phosphate which is substantially free of impurities, such as for example heavy metal impurities.

In its generic embodiments the present invention provides a method of preparing a titanium oxide, possessing rutile crystal structure, directly from a titanium-bearing ore digestion liquor. For purposes of illustration the hereinafter described method of carrying out the invention is directed to the use of titanium sulfate liquors, but it is to be understood that the method of the invention will operate with equal efficiency on other titanium digestion liquors as for example titanium nitrate liquors, and like solutions of titanium compounds.

The liquor which is obtained by the well-known sulfuric acid digestion of, for example ilmenite, is treated with phosphoric acid, disodium phosphate, or other water-soluble phosphates to convert the titanium sulfate to a phosphoric acid salt of titanium. Inasmuch as titanium sulfate liquors usually contain a relatively large excess of free sulfuric acid, it may be desirable to partially neutralize the excess acid by addition to the liquor of an alkaline material such as lime or other like alkaline materials. The partial neutralization of the excess sulfuric acid allows the subsequent formation of titanium phosphate to be carried out by the addition to the liquor of a relatively smaller amount of phosphoric acid than would be otherwise permissible. There may also be added to the titanium sulfate liquor various filter aids such as gypsum, etc., which serve to keep the precipitate in a somewhat flocculated condition, thus facilitating the removal of the soluble salt impurities. Whether or not the phosphoric acid treatment of the titanium sulfate liquor is modified as above described, the excess acid, iron salts, and other soluble salts are removed from the titanium phosphate by water washing. The titanium phosphate is then treated with an alkali metal alkali to convert the titanium phosphate to an alkali metal titanate and disodium phosphate, substantially all of which may be recovered and recirculated to the titanium sulfate liquor to produce additional titanium phosphate. The alkali metal titanate is thereafter treated with an aqueous solution of a soluble monobasic acid, the mixture being subjected to heat treatment to hydrolyze the so-formed tetravalent titanium compound and to cause precipitation thereof as a titanium oxide exhibiting rutile characteristics. Titanium oxides produced by this method have been shown by X-ray analysis to be composed substantially completely of crystals having rutile structure.

The rutile titanium oxide prepared by the method of this invention is extremely efficient as a seed material for the conversion of anatase titanium oxide to rutile during calcination thereof. The increased activity of this seed is attributed to the high rate of solubility of the alkali metal titanate, prepared from titanium phosphate, in aqueous monobasic acid solution. It has previously been demonstrated that the solubility of various alkali metal titanates in aqueous solutions of monobasic acids is dependent upon both the source of the titanate and the particle size of the material. The alkali metal titanate of the invention, prepared from titanium phosphate, is composed of much finer particles than are alkali metal titanates derived from other sources and the increased rate of solubility in aqueous monobasic acids of this titanate is due principally to its extremely fine particle size. Upon addition of an alkali metal titanate to an aqueous monobasic acid the titanate dissolves, the rate of solution being dependent upon the particle size of the titanate. As the solution is heated to accomplish hydrolysis of the tetravalent titanium, colloidal particles of titanium oxide are formed, and these colloidal particles act as nuclei for the growth of crystals as the hydrolysis continues and the formation of titanium oxide becomes more rapid. Ordinarily any excess alkali must be removed from the alkali metal titanate before carrying out the monobasic acid treatment thereof, and it has been highly desirable to remove as much combined alkali metal as possible by thoroughly washing the alkali metal titanate with an acid. The removal of the excess and combined alkali metal has been necessary in prior processes because it forms a salt by reaction with the monobasic acid which salt tends to flocculate the colloidal titanium oxide, thus rendering the individual particles less effective as nuclei for crystal formation during the hydrolysis of the tetravalent titanium compound. The increased solubility of the alkali metal titanate of this invention is of such magnitude that the removal of excess alkali therefrom is unnecessary. Thus the present invention provides a distinct economic advantage over the prior art procedures by means of the elimination of the alkali removal treatment.

In a specific embodiment of the invention titanium sulfate liquor having a basicity factor of about 25.0 obtained from the sulfuric acid digestion of ilmenite, and which has been clarified to some extent, is reacted with a stoichiometrical amount of phosphoric acid. The phosphoric acid may be added as such or preferably as an alkali metal phosphate, such as disodium phosphate obtained by washing the sodium titanate as hereinbefore mentioned, which is converted in situ to phosphoric acid by the free sulfuric acid present in the titanium sulfate liquor. This titanium phosphate-forming reaction may be carried out at ordinary or elevated temperatures and it has been found convenient to employ the titanium sulfate liquor directly as it is received from the clarification process. Upon precipitation of the insoluble titanium phosphate, the product is water washed to remove ferrous sulfate and other soluble salts carried down by the precipitate. This titanium phosphate is converted to sodium titanate by adding about 1-5 parts of NaOH to the titanium phosphate for each part of $TiO_2$ in the presence of sufficient water to maintain fluidity of the mixture during the reaction. The mixture is heated for about 1-5 hours at a temperature of from about 70° C. to about 100° C. although higher temperatures, up to the fusion temperature of the mixture, may be employed if desired. The sodium titanate thus formed is washed substantially free of $PO_4$ ions and contains about 80-85% $TiO_2$ and about 15-20% $Na_2O$. The sodium titanate so produced is then treated with hydrochloric acid in sufficient quantity to neutralize the sodium oxide and preferably in sufficient excess for about 20% to about 50% of theory for the formation of titanium tetrachloride. The hydrochloric acid slurry is diluted with water, and boiled for about 1-3 hours. During the boiling period the titanium content is transformed to a desirable rutile seed which is extremely efficient for converting titanium sulfate hydrolysate of anatase crystal structure to rutile crystal structure during calcination.

If desired, previous to the final step of boiling the sodium titanate with water the sodium titanate may be treated with an acid and washed with water to remove excess alkali but, as hereinbefore stated, such treatment is unnecessary as the sodium salt which is formed during the acid treatment does not interfere with the formation of my novel rutile seed.

It is also to be understood that, although the titanium phosphate employed in the novel method of this invention has been described for illustrative purposes as having been prepared from titanium sulfate solutions, titanium phosphate from any other source will function equally well in the preparation of a rutile seeding agent.

In order that the invention may be more thoroughly understood by those skilled in the art, the following specific examples are given. Although the examples embody specific details of the method, it is to be understood that they are given primarily for purposes of illustration, the scope of the invention being defined by the appended claims.

*Example 1*

To 2 liters of a clarified titanium sulfate liquor, containing 70 gm. per liter of $TiO_2$ and 70 gm. per liter of $FeSO_4$, was added 500 ml. of a solution of $Na_2HPO_4$ containing the equivalent of 88 gm. of $H_3PO_4$. The temperature of the liquor was 60° C., and the $Na_2HPO_4$ was added over a period of 20 minutes. The product was filtered and was washed substantially free of $FeSO_4$ and other soluble salts. Analysis of the filtrate indicated that there was substantially complete precipitation of the titanium. 1.5 parts of NaOH was added to the product for each part of $TiO_2$ and enough water was added to maintain the mixture in a fluid condition. The mixture was heated for two hours at about 90° C. after which it was filtered and washed with water until the wash water was substantially free of $PO_4$ ions. Analysis of the precipitate showed a content of 81.3% $TiO_2$ and 0.2% of $P_2O_5$. The filter cake was slurried in 185 cc. of commercial 20° Bé. hydrochloric acid diluted with about 1 liter of water, and boiled for about 1 hour. The seed so produced was very active in converting anatase titanium sulfate hydrolysate to rutile.

*Example 2*

The procedure of Example 1 was repeated, except that 500 ml. of a solution containing 88 gm. of $H_3PO_4$ was employed instead of $Na_2HPO_4$. The sodium titanate prepared from the titanium phosphate showed, upon analysis, 81.4% $TiO_2$, 0.26% $P_2O_5$, and 0.08% $Fe_2O_3$. The rutile seed prepared from this material was very similar to that of Example 1.

*Example 3*

The procedure was repeated as in Example 1, except that 500 ml. of a solution containing 145.0 gms. $H_3PO_4$ was substituted for the $Na_2HPO_4$ solution, and the precipitation was carried out at room temperature. Substantially all of the titanium was precipitated. The sodium titanate prepared from this product after washing and dehydrating analyzed 82.5% $TiO_2$. The rutile seed prepared from the sodium titanate was similar to that of Example 1.

*Example 4*

Hydrated titanium oxide obtained by the hydrolysis of titanium sulfate solution and which would ordinarily be of the anatase crystal modification upon calcination was calcined in the presence of 5.0% of the seed material produced according to the aforegoing examples. There was also added to the mixture small amounts of the ordinary fluxing agents. The calcination was carried out at about 975° C. for 5-6 hours. The pigment so produced, after being milled to the desired particle size, had a tinting strength of 1680, and had extremely good color characteristics.

Pigments produced by the use of previous methods ordinarily have tinting strengths of from about 1500 to about 1600, while their color is often of somewhat undesirable blue or brown tint.

It will be apparent from the aforegoing description and examples that the present invention provides an economically desirable method of producing rutile titanium oxide pigment which has tinting strength and color characteristics which are equal to or better than those obtainable by prior methods.

What I claim is:

1. A process for preparing a rutile calcination seeding agent which comprises preparing titanium phosphate by reacting a titanium compound with phosphoric acid, reacting the titanium phosphate with an alkali metal alkali, washing the resulting alkali metal titanate free of alkali phosphates, reacting the resulting substantially $PO_4$ ion-free alkali metal titanate with an aqueous inorganic monobasic acid in sufficient amount to completely convert the alkali metal content to the salt of the monobasic acid and to theoretically convert about 20% to about 50% of the titanium content to the salt of the monobasic acid, and boiling the resultant mixture for a period of time, whereby the titanium content is substantially converted to a rutile seed.

2. A process for producing rutile calcination seed for use in the production of titanium dioxide having rutile crystal structure, which comprises precipitating titanium phosphate from a titanium sulfate solution obtained by sulfuric acid digestion of titanium-bearing ores by adding thereto a $PO_4$ ion-containing compound, reacting the titanium phosphate so produced with an alkali metal alkali, water washing the resulting alkali metal titanate until it is substantially free of $PO_4$ ions, reacting the resulting alkali metal titanate precipitate with an aqueous inorganic monobasic acid in sufficient amount to completely convert the alkali metal content to the salt of the monobasic acid and to theoretically convert about 20% to about 50% of the titanium content to the salt of the monobasic acid, and boiling the resultant mixture for a period of time, whereby the titanium content is substantially converted to a rutile seed.

3. The method of producing rutile titanium dioxide from titanium sulfate precipitate which ordinarily calcines to anatase, which comprises calcining the precipitate in admixture with significant quantities of a rutile calcination seed prepared by converting titanium phosphate to an alkali metal titanate by reaction thereof with an alkali metal alkali, washing the resulting alkali metal titanate free of alkali phosphates, reacting the substantially $PO_4$ ion-free alkali metal titanate with an aqueous monobasic acid in sufficient amount to completely convert the alkali metal content to the salt of the monobasic acid and to theoretically convert about 20% to about 50% of the titanium content to the salt of the monobasic acid, and boiling the resultant mixture for a period of time whereby the titanium content is substantially converted to a rutile seed, the calcination being performed at a temperature not exceeding 1000° C.

CHARLES A. TANNER, Jr.

REFERENCES CITED

The following references are of record in the file of this patent:

UNITED STATES PATENTS

| Number | Name | Date |
|---|---|---|
| 2,427,165 | Tanner et al. | Sept. 9, 1947 |